(12) United States Patent
Chinnaswamy et al.

(10) Patent No.: US 7,534,459 B2
(45) Date of Patent: May 19, 2009

(54) PROCESS FOR PREPARING HYBRID PROTEINS

(75) Inventors: Rangaswamy Chinnaswamy, Kansas City, MO (US); Sukh Bassi, Atchison, KS (US); Clodualdo C. Maningat, Platte City, MO (US)

(73) Assignee: MGP Ingredients, Inc., Atchison, KS (US)

( * ) Notice: Subject to any disclaimer, the term of this patent is extended or adjusted under 35 U.S.C. 154(b) by 810 days.

(21) Appl. No.: 10/284,552

(22) Filed: Oct. 30, 2002

(65) Prior Publication Data

US 2004/0086613 A1    May 6, 2004

(51) Int. Cl.
   *A23J 1/00*    (2006.01)
(52) U.S. Cl. ...................................... 426/511
(58) Field of Classification Search .................. 99/17, 99/14, 324, 452; 426/622, 629, 644, 656, 426/657, 655, 511
   See application file for complete search history.

(56) References Cited

U.S. PATENT DOCUMENTS

| | | | |
|---|---|---|---|
| 3,754,926 A | 8/1973 | Strommer et al. |
| 3,965,268 A | 6/1976 | Stocker et al. |
| 4,036,996 A | 7/1977 | Chandler et al. |
| 4,038,431 A | 7/1977 | Hildebolt |
| 4,038,432 A | 7/1977 | Hildebolt et al. |
| 4,062,987 A | 12/1977 | Hildebolt |
| 4,500,454 A | 2/1985 | Chang |
| 4,650,856 A | 3/1987 | Yagi et al. |
| 5,068,117 A | 11/1991 | McCabe |
| 5,100,679 A | 3/1992 | Delrue |

FOREIGN PATENT DOCUMENTS

| | | | |
|---|---|---|---|
| JP | 356021568 A | 2/1981 |
| JP | 360030645 A | 2/1985 |
| JP | 362146569 | 12/1985 |
| JP | 361227739 A | 10/1986 |

OTHER PUBLICATIONS

Ballegu: Effect of a Hydrothermal Process on Functional Properties of Wheat Gluten Isolate; Dissertation; Kansas State University, 2001.

*Primary Examiner*—Karen Cochrane Carlson
(74) *Attorney, Agent, or Firm*—Hovey Williams LLP

(57) ABSTRACT

Hydrothermal processes are provided for preparing hybrid proteins containing altered SS/SH bonds, thereby yielding hybrid proteins having enhanced functional properties. The processes involve steam treatment of an aqueous protein-containing slurry containing at least two different proteins in a jet cooker (16) or similar device in order to heat shock and thereby alter the conformation of some of the proteins, followed by relatively rapid cooling to cause formation of the desired hybrids. Plant and animal proteins may be processed, and the starting slurry can be pH-modified and/or supplemented with one or more additional ingredients (e.g., salts, phosphates, fatty acids, polysaccharides, alcohols, aromatic compounds). The hybrid proteins are useful as food ingredients (e.g., solubility, wetability, dispersibility, foaming, emulsification, viscosity, gelation or thickening agents).

32 Claims, 3 Drawing Sheets

PROCESS FOR PREPARING HYBRID PROTEINS

BACKGROUND OF THE INVENTION

1. Field of the Invention

The present invention is broadly concerned with processes for the production of hybrid proteins formed by the interprotein and/or intraprotein rearrangement of SS/SH bonds in a plurality of different starting proteins, in order to obtain hybrid proteins having desired functional characteristics. More particularly, the invention is concerned with such processes and the resultant hybrid proteins wherein an aqueous, protein-containing slurry comprising at least two different proteins is hydrothermally treated in a jet cooker or similar device in the presence of steam, in order to alter the conformation of at least some of the proteins. The treated slurry is then cooled to cause the formation of hybirds proteins, which are recovered by spray drying or similar methods.

2. Description of the Prior Art

Proteins are essentially composed of linear chains of amino acid residues linked together by peptide bonds which join the nitrogen atoms of amino groups to the carbon atoms of preceding carboxyl groups. All amino acids have identical backbone structure and differ only in their side chains. The physiochemical properties of amino acid residue side chains and the sequence of these residues are the dominant factors in determining the structure and function of proteins. Protein molecules also vary widely in size, e.g., enzymes may vary in size from about 13 kDa up to several thousand kDa.

The structure of proteins is recognized at four distinct levels of importance. The most basic level is the primary structure, i.e., the sequence of amino acid residues in the chain. The secondary structure of proteins relates to the conformation of amino acid residues which are relatively close to one another in the chain. Three conformations are known: $\alpha$-helix, $\beta$-pleated sheet and aperiodic (also known as random coil). The tertiary structure of proteins refers to the spatial structure thereof, resulting from hydrophobic and electrostatic forces, and disulfide bridges between aliphatic and aromatic side chains of the protein. Hydrophobic interactions are the major forces responsible for tertiary structure. The fourth and last protein structure is quaternary structure. This essentially describes the nature of the assemblage of protein subunits to form a massive aggregated molecule.

The properties of food and proteinaceous feed ingredients may be placed in two categories, namely nutritional and functional properties. Functional properties are defined as those properties of a food or food ingredient that affect its utilization, or influence the behavior of the food or food system during processing, handling, storage, preparation and consumption. For a given protein to perform well in a food system, it should normally possess multiple functionalities. For example, egg white possesses multiple functionalities including foaming, emulsifying, heat setting, and binding/adhesion. The functional properties of any protein are basically related to its physiochemical and structural properties including size, shape, amino acid composition and sequence, net charge, charge distribution, hydrophobicity/hydrophilicity ratio, and the secondary, tertiary and quaternary structural arrangements.

Efforts have been made in the past to modify or rearrange proteins in order to alter the functional properties thereof. For example, European Patent No. 782825 describes a method of rendering whey protein more hydrophobic in order to improve its gelling properties. Commercially available whey protein concentrate was heated to 75° C. along with sodium or magnesium caseinate, giving the resultant protein an increase in hydrophobicity. Lasztity et al., *Narung,* 42:210 (1998) studied wheat germ protein systems modified with urea to disassociate quaternary structures, $\beta$-mercaptoethanol to reduce SS bonds and aeration to reoxidize SH groups to SS bonds. This treatment altered the surface protein properties of the wheat germ protein.

The dissertation of Ballegu, *Effect of Hydrothermal Process on Functional Properties of Wheat Gluten Isolate* (2001), describes hydrothermal processing of wheat gluten isolate using a jet cooker. HPLC profiles of the recovered protein samples revealed polymerization of gliadin molecules through aggregation and/or crosslinking to give glutenin or glutenin-like molecule; the extent of polymerization was found to depend upon the process severity. The viscosity of the hydrothermally processed wheat gluten isolate was found to be higher than that of the control, regardless of processing conditions.

Other references include: Cosio et al., *J. Dairy Sci.,* 83:1933 (2000); Apichartsrangkoon, *Food Sci.,* 67:653 (2002); U.S. Pat. Nos. 4,038,431, 4,500,454, 3,754,926, 5,100,679, 5,068,117, 4,036,996, 3,965,268, 4,038,432, 4,062,987, and 4,650,856; and Japanese Patents Nos. 356021568, 362146659, 361227739 and 360030645.

SUMMARY OF THE INVENTION

The present invention is directed to the formation of hybrid proteins from plural, different starting proteins. Broadly speaking, the method of the invention involves providing an aqueous, protein-containing slurry including at least two different proteins therein. This slurry is introduced together with steam into a pressurized injection zone, where the proteins are treated under conditions of heat and pressure and for a time sufficient to alter the conformation of at least some of the proteins. Following such hydrothermal treating, the treated slurry is cooled and the hybrid proteins are recovered.

Preferably, the aqueous starting slurry should have a solids content of no more than about 35% by weight, and the conditions within the pressurized injection zone should be selected so that a temperature of from about 100-350° F. and a pressure of from about 10-150 psi are maintained. The residence time of the slurry within the injection zone should be on the order of 10 seconds to 2 ½ minutes. The cooling step is preferably carried out over a short period of time (about 10-60 seconds) to achieve a temperature of from about 50-150° F.; cooling may be accomplished by exposure to the atmosphere and/or by supplemental cooling. The dried hybrid protein products should have a moisture content of from about 3-10% by weight, wet basis.

Hybrid proteins in accordance with the invention find particular utility in food systems, serving as solubility, wetability, dispersibility, foaming, emulsification, viscosity, gelation or thickening agents, depending upon the specific properties of the hybrid proteins. The processes of the invention can be tailored to enhance particular properties of the starting proteins.

DETAILED DESCRIPTION OF THE PREFERRED EMBODIMENT

Figure 1:
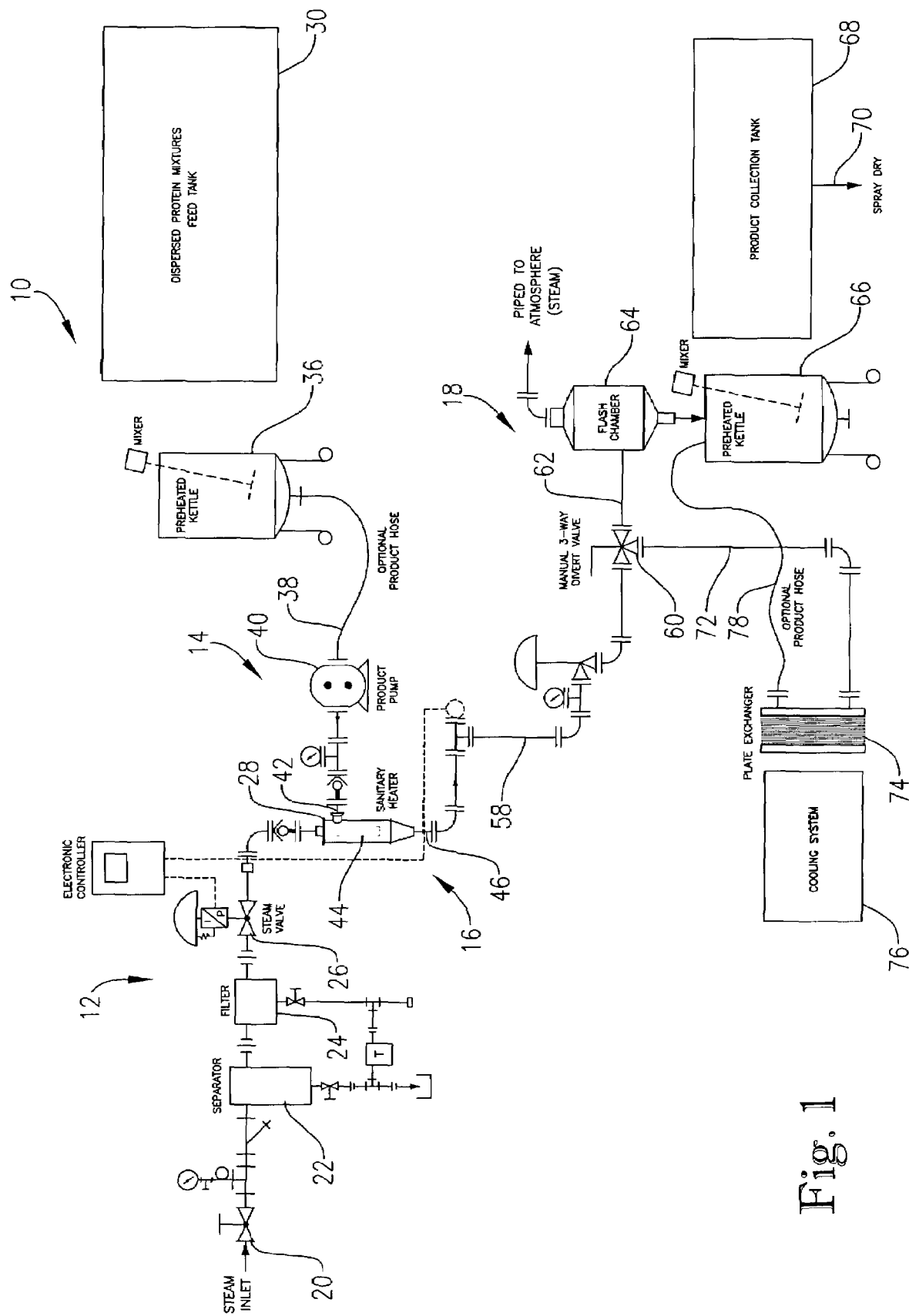
FIG. 1 is a schematic illustration of a suitable processing apparatus in accordance with the invention.

A suitable apparatus 10 for carrying out the process of the invention is schematically illustrated in FIG. 1. Broadly speaking, the apparatus 10 includes a steam injection assembly 12, a slurry preparation and injection assembly 14, a jet cooker 16, and a recovery assembly 18.

The steam assembly 10 includes an inlet valve 20 with an inline separator 22 and filter 24 leading to electronically controlled valve 26, the output of the latter leading to the steam inlet 28 of jet cooker 16. The assembly 14 includes a slurry feed tank 30 together with a preheat tank 36; the latter has product line 38 directed to product pump 40. The outlet of the pump 40 leads to the slurry inlet 42 of cooker 16.

Figure 2:
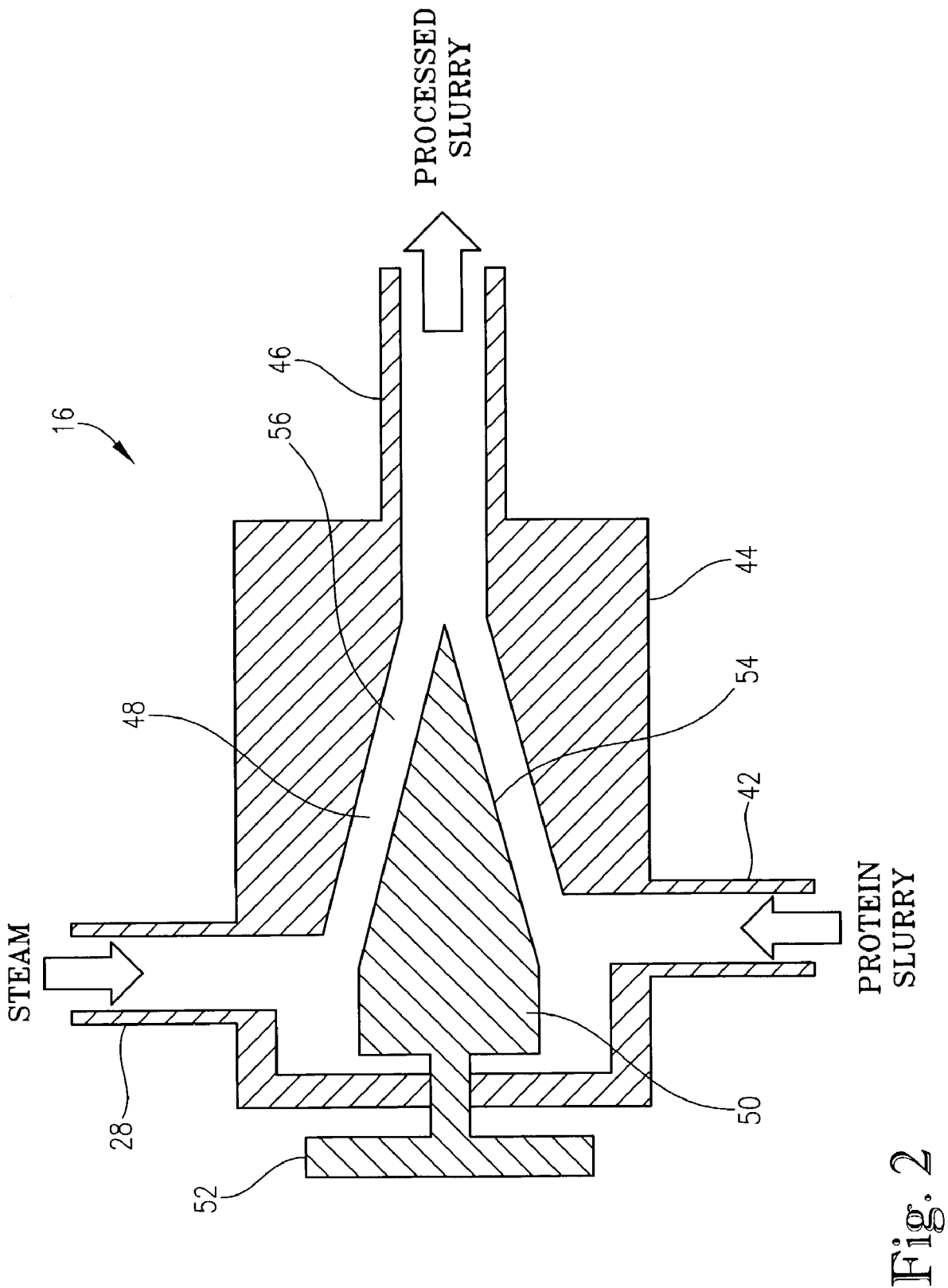
FIG. 2 is a schematic representation of a preferred type of jet cooker used in the process of the invention.

The jet cooker 16 is further illustrated in FIG. 2 and includes a main body 44 having steam inlet 28 and slurry inlet 42 coupled thereto, as well as a processed slurry output line 46. Internally, the body 44 presents a converging passageway 48 leading to the output line 46. An adjustable valve member 50 is disposed within passageway 48 and is axially shiftable therein by means of rotatable adjustment wheel 52. It will be observed that the member 50 presents a conical wall 54 which generally mates with the adjacent defining wall surfaces of the body 44. As will be readily appreciated, the body 50 may be adjusted to provide a greater or lesser clearance between the conical wall 54 and the adjacent main body wall surfaces. This in effect creates a restricted pressurized injection zone 56 within the confines of the body 44.

The recovery assembly 18 includes a product conveying line 58 equipped with appropriate valving, and leading to a three-way diversion valve 60. One output leg 62 of the valve 60 leads to flash chamber 64 permitting flash of steam to the atmosphere with consequent cooling. The slurry output from chamber 64 is directed to a heated kettle 66 coupled to product collection tank 68. The recovered slurry within tank 68 is then passed via line 70 to a conventional spray dryer. The opposite leg 72 from valve 66 passes to plate-type heat exchanger 74, operated using conventional cooling system 76. The output 78 from exchanger 74 may pass to kettle 66 or directly to tank 68. As will be readily appreciated, the assembly 18 thus allows the user the option of cooling solely by exposure to ambient atmosphere, or with supplemental cooling via exchanger 74 prior to drying.

In use, the apparatus 10 functions to treat protein slurries so as to create hybrid proteins having desired functional characteristics. As explained above, in broad terms the method of the invention involves providing an aqueous, protein-containing slurry made up of at least two different proteins; this slurry is introduced along with steam into a pressurized injection zone, and the proteins are treated therein under conditions to alter the conformation of at least some of the proteins. Thereafter, the treated slurry is cooled and hybrid proteins are recovered.

The incoming slurry can have a solids content of up to about 50% by weight, but more preferably it is dilute and should have a solids content of up to about 35% by weight and still more preferably from about 0.5-20% by weight. The total protein content of the starting slurry is generally in the range of from about 3.5-45% by weight, and more preferably from about 10-45% by weight.

A wide variety of proteins may be used in the invention, but advantageously the selected proteins should themselves be concentrated, i.e., the protein-bearing materials used should have a protein content of at least about 65% by weight, more preferably from about 70-90% by weight. In terms of soy protein for example, either soy concentrate (typically around 75% by weight soy protein) or soy isolate (typically about 90% by weight soy protein) should be used in lieu of lower protein concentration products such as soy flour or meal. Virtually any combination of proteins may be employed, i.e., the proteins may be selected from the group consisting of plant and animal proteins. Exemplary plant proteins are selected from the group consisting of soy, wheat, oat, rice, peanut, cotton seed, corn, sorghum, fruits, and mixtures thereof, whereas, suitable animal proteins are selected from the group consisting of beef, poultry, pork, milk, whey, eggs, and mixtures thereof. It should also be understood that the starting proteins may be native proteins or may be modified by any known means such as chemical or enzymatic modification. To give but one example, deamidated gluten may be used in the invention along with another protein such as corn zein.

In many cases, it is desirable to alter the pH of the starting protein slurry to a pH approximating the average isoelectric point of proteins within the slurry. In practice, pH levels of from about 2-9, and more preferably from about 3.5-7.5 are useful; in many cases, a pH modification to a level of from about 2-4 or from about 7-9 are effective.

If desired, the slurry may also be supplemented with additional ingredients designed to achieve further or different protein hybridization. Thus, the slurry may include one or more additional ingredients such as those selected from the group consisting of sulfur-containing compounds such as bisulfites or $SO_2$ (20-200 ppm), oxygen (20-200 ppm), alkali metal and/or alkaline earth metal salts (e.g., chlorides, bromides, or carbonates, about 0.01-2% by weight), phosphates (poly and pyrophosphates, 0.01-2% by weight), C12-C22 fatty acids (0.01-2% by weight), polysaccharides (e.g., xanthan gum, 0.1-2% by weight), C1-C4 aliphatic alcohols or aromatic compounds (e.g., toluene, 0.1-10% by weight). The foregoing additional ingredient levels of use are approximate, and are based upon the total weight of protein in the slurry taken as 100% by weight.

The processing conditions within jet cooker 16 are selected so as to alter the conformation of at least some of the proteins within the starting slurry. Thus, temperature conditions of from about 100-350° F. should be maintained within zone 56, more preferably from about 250-350° F. Pressure conditions in the zone 56 are typically maintained at a level of from about 10-150 psi, more preferably from about 60-135 psi. Retention time within the zone 56 should be from about 10 seconds to 2½ minutes, and more preferably from about 25-125 seconds.

The treated slurry exiting jet cooker 16 via output line 46 is normally cooled in order to assist in the formation of hybrid proteins. It is preferred that the treated slurry be cooled to a temperature of from about 50-150° F., and more preferably from about 75-125° F. Moreover, such cooling should be done over a relatively short period of time usually from about 10-60 seconds and more preferably from about 15-40 seconds. In some instances sufficient cooling may be obtained simply by flashing the product to the atmosphere.

The treated slurry, whether cooled or not, is advantageously dried to permit recovery of the hybrid proteins. A variety of techniques may be used for drying, but most efficient drying is carried out in a conventional spray dryer. The moisture content of the final recovered hybrid proteins should be from about 3-10% by weight, or more preferably from about 4-7% by weight, wet basis.

Figure 3:
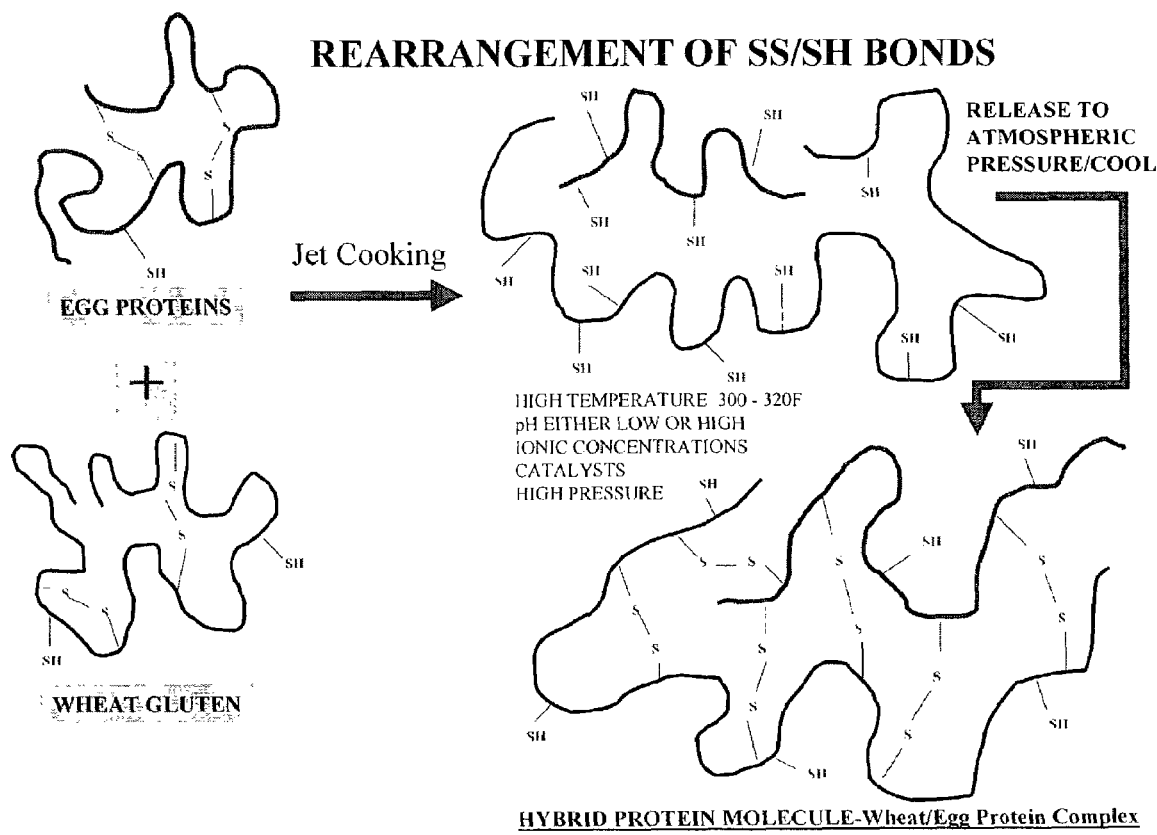
FIG. 3 is a schematic representation illustrating a mechanism for the production of hybrid proteins using the process of the invention.

Although not wishing to be bound by any theory, it is believed that hybrid proteins are formed in the process of the invention by the combination of heat shock effected in the jet cooker 16, followed by cooling. FIG. 3 schematically illustrates an exemplary process wherein wheat gluten and egg proteins are co-processed in a jet cooker. In the jet cooker, the protein heat shock effectively alters the conformation of the starting protein molecules. Thereafter, upon release to atmospheric pressure with or without cooling, the heat shocked proteins reform by the rearrangement of SS/SH bonds. This SS/SH bond rearrangement may occur interprotein or intraprotein or both as shown in FIG. 3, so that the hybrid protein molecules are different from the starting proteins owing to changes in gross amino acid composition, and/or the quantity of disulfide bonds or thiol groups present. Thus, the hybrid proteins have different charge densities (domains), which correspondingly alters the hydrophobic and hydrophilic properties thereof. The overall hybrid protein hydrophobicity and hydrophilicity, along with rearrangement of disulfide bonds therein, essentially decides the status of the secondary, tertiary and quaternary protein structures which in turn influences the functionality of the hybrid proteins in food systems for example. Moreover, these alterations in the hybrid proteins will impact upon their molecular surface related properties (solubility, wetability, dispersibility, foaming and emulsification), and hydrodynamic properties (viscosity, gelation, thickening).

We claim:

1. A method of preparing hybrid proteins comprising the steps of:
    providing an aqueous, protein-containing slurry comprising at least two different proteins and having a solids content of up to about 0.5-20% by weight;
    at least one of said different proteins selected from the group consisting of soy, wheat, oat, rice, peanut, cotton seed, corn, sorghum, fruits, beef, poultry, pork, milk, whey, eggs, and mixture thereof;
    introducing said slurry and steam into a pressurized injection zone, and treating said proteins therein under conditions of heat and pressure and for a time sufficient to alter the conformation of at least some of the proteins;
    cooling the treated slurry to a temperature of from about 50-150° F. over a period of from about 10-60 seconds to cause the formation of said hybirds proteins; and
    recovering hybrid proteins.

2. The method of claim 1, said slurry having a pH approximating the average isoelectric point of the proteins within said slurry.

3. The method of claim 2, said pH being from about 2-4 or from about 7-9.

4. The method of claim 1, said slurry including one or more additional ingredients selected from the group consisting of sulfur-containing compounds, oxygen, alkali metal salts, alkaline earth metal salts, phosphates, C12-C22 fatty acids, polysaccharides, C1-C4 alcohols, and aromatic compounds.

5. The method of claim 1, including the step of introducing said slurry and steam into a jet cooker.

6. The method of claim 1, including the step of subjecting said proteins to a temperature of from about 100-350° F. within said zone.

7. The method of claim 6, said temperature being from about 250-350° F.

8. The method of claim 1, including the step of subjecting said proteins to a pressure of from about 10-150 psi within said zone.

9. The method of claim 8, said pressure being from about 60-135 psi.

10. The method of claim 1, including the step of retaining said proteins within said zone for an average time of from about 10 seconds to 2-½ minutes.

11. The method of claim 1, said time being from about 25-125 seconds.

12. The method of claim 1, said temperature being from about 75-125° F.

13. The method of claim 1, said period being from about 15-40 seconds.

14. The method of claim 1, said recovery step comprising the step of drying the treated slurry to obtain said hybrid proteins.

15. The method of claim 14, said drying step comprising spray drying.

16. The method of claim 1, said recovered hybrid proteins having a moisture content of from about 3-10% by weight, wet basis.

17. The method of claim 16, said moisture content being from about 4-7% by weight, wet basis.

18. A method of preparing hybrid proteins comprising the steps of:
    providing an aqueous, protein-containing slurry comprising at least two different proteins and having a solids content of from about 0.5-20% by weight;
    at least one of said different proteins selected from the group consisting of soy, wheat, oat, rice, peanut, cotton seed, corn, sorghum, fruits, beef, poultry, pork, milk, whey, eggs, and mixtures thereof;
    introducing said slurry and steam into a pressurized injection zone, and treating said proteins therein under conditions of heat and pressure and for a time sufficient to alter the conformation of at least some of the proteins;
    cooling the treated slurry to a temperature of from about 50-150° F. to cause the formation of said hybrid proteins; and
    spray drying the treated slurry and recoverina hybrid proteins.

19. The method of claim 18, said slurry having a pH approximating the average isoelectric point of the proteins within said slurry.

20. The method of claim 19, said pH being from about 2-4 or from about 7-9.

21. The method of claim 18. said slurry including one or more additional ingredients selected from the group consisting of sulfur-containing compounds, oxygen, alkali metal salts, alkaline earth metal salts, phosphates, C12-C22 fatty acids, polysaccharides, C1-C4 alcohols, and aromatic compounds.

22. The method of claim 18, including the step of introducing said slurry and steam into a jet cooker.

23. The method of claim 18, including the step of subjecting said proteins to a temperature of from about 100-350° F. within said zone.

24. The method of claim 23, said temperature being from about 250-350° F.

25. The method of claim 18, including the step of subjecting said proteins to a pressure of from about 10-150 psi within said zone.

26. The method of claim 25, said pressure being from about 60-135 psi.

27. The method of claim 18, including the step of retaining said proteins within said zone for an average time of from about 10 seconds to 2-½ minutes.

28. The method of claim 18, said time being from about 25-125 seconds.

29. The method of claim 18, said temperature being from about 75-125° F.

30. The method of claim 18, said period beina from about 15-40 seconds.

31. The method of claim 18, said recovered hybrid proteins having a moisture content of from about 3-10% by weight, wet basis.

32. The method of claim 31, said moisture content being from about 4-7% by weight, wet basis.

* * * * *